(12) United States Patent
Kohut et al.

(10) Patent No.: US 6,343,241 B1
(45) Date of Patent: Jan. 29, 2002

(54) ROBOTIC VEHICLE SERVICING SYSTEM

(75) Inventors: Gary W. Kohut, Fairfax Station; Joe M. Minai, Fairfax, both of VA (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/057,596

(22) Filed: Apr. 9, 1998

(51) Int. Cl.⁷ ............................................. G06F 17/60
(52) U.S. Cl. ..................... 700/232; 700/241; 705/16
(58) Field of Search .................. 705/16, 21; 700/232, 700/241; 235/380, 382, 375

(56) References Cited

U.S. PATENT DOCUMENTS

| | | | |
|---|---|---|---|
| 2,083,078 A | 6/1937 | Mayo | 226/120 |
| 3,527,268 A | 9/1970 | GInsburgh | 141/98 |
| 3,642,036 A | 2/1972 | Ginsburgh et al. | 141/94 |
| 3,776,285 A | 12/1973 | Nicholls | 141/386 |
| 3,796,240 A | 3/1974 | Miller, Jr. | 141/1 |
| 3,814,148 A * | 6/1974 | Wostl | 141/98 |
| 4,241,770 A | 12/1980 | Robertson | 141/198 |
| 4,263,945 A | 4/1981 | Van Ness | 141/98 |

(List continued on next page.)

FOREIGN PATENT DOCUMENTS

| | | |
|---|---|---|
| DE | 113806 | 9/1900 |
| DE | 29 29 192 A1 | 4/1981 |
| DE | 42 42 243 A1 | 6/1994 |
| DE | 42 42 244 A1 | 6/1994 |
| DE | 42 43 883 A1 | 6/1994 |
| DE | 44 19 657 C1 | 11/1995 |
| EP | 0 418 744 A3 | 3/1991 |
| EP | 0 659 603 A1 | 11/1994 |
| EP | 0 687 647 A1 | 12/1995 |
| FR | 2 668 107 | 4/1992 |
| JP | 7-137799 | 5/1995 |
| JP | 7-257693 | 10/1995 |
| JP | 7-257694 | 10/1995 |
| JP | 7-257700 | 10/1995 |
| JP | 8-26399 | 1/1996 |
| WO | WO 94/03391 | 2/1994 |
| WO | WO 94/05592 | 3/1994 |
| WO | WO 94/06031 | 3/1994 |
| WO | WO 95/32919 | 12/1995 |
| WO | WO 96/05135 | 2/1996 |
| WO | WO 96/05136 | 2/1996 |

OTHER PUBLICATIONS

Kjeldgaard, Todd, *Follies*, "Robopump" (Undated).
Lobred, Peter, *U.S. Oil Week*, "BP Plans Robotic Pump, Mobil May Follow Suit," Oct. 27, 1997.
Koch, Wolf H., Ph.D., *Petroleum Equipment & Technology*, "Is the Long Wait for Robotic Fueling," pp. 14, 16–18 & 49, Sep./Oct. 1997.
Autofill Europe AB, "No, She Is Not Drawing Cash from Her Bank Account. She Is Filling Her Car Up.", Brochure (Undated).
Callanan, John, *The Journal of Petroleum Marketing*, vol. 10, No. 7, Jul. 1997, "Where Have All the Good Times Gone?", p. 3.
Callanan, John, *The Journal of Petroleum Marketing*, vol. 10, No. 7, Jul. 1997, "Can Fueling Up Be Fun?", pp. 16–18.

* cited by examiner

*Primary Examiner*—Paul P. Gordon
(74) *Attorney, Agent, or Firm*—Hunton & Williams

(57) ABSTRACT

An automated system is provided for servicing a vehicle and its occupants. A first identification signal is communicated either while the vehicle is approaching the terminal or upon arrival and a second control signal is then generated from within the vehicle beginning and terminating the requested servicing and maintaining control over the operation. Vehicle servicing, such as fueling and washing is provided robotically to the vehicle without the vehicle occupants being required to emerge from the vehicle or become physically involved in its implementation. Payment is automatically charged to the customers account.

13 Claims, 13 Drawing Sheets

U.S. PATENT DOCUMENTS

| | | | |
|---|---|---|---|
| 4,681,144 A | 7/1987 | Horvath et al. | 141/1 |
| 4,881,581 A | 11/1989 | Hollerback | 141/113 |
| 4,907,630 A | 3/1990 | Kulikowski et al. | 141/384 |
| 4,947,905 A | 8/1990 | Nitzberg et al. | 141/206 |
| 5,072,380 A * | 12/1991 | Randelman et al. | 364/406 |
| 5,110,010 A | 5/1992 | Smith | 222/75 |
| 5,163,473 A | 11/1992 | Strnad, Jr. | 137/588 |
| 5,238,034 A | 8/1993 | Corfitsen | 141/94 |
| 5,251,661 A | 10/1993 | Hugues et al. | 137/637.1 |
| 5,383,500 A | 1/1995 | Dwars et al. | 141/98 |
| 5,392,049 A | 2/1995 | Gunnarsson | 342/42 |
| 5,392,824 A | 2/1995 | Rabinovich | 141/59 |
| 5,393,195 A | 2/1995 | Corfitsen | 414/749 |
| 5,404,923 A | 4/1995 | Yamamoto et al. | 141/279 |
| 5,503,199 A | 4/1996 | Whitley, II et al. | 141/312 |
| 5,609,190 A | 3/1997 | Anderson et al. | 141/59 |
| 5,628,351 A | 5/1997 | Ramsey, Jr. et al. | 141/98 |
| 5,634,503 A | 6/1997 | Musil et al. | 141/232 |
| 5,638,875 A | 6/1997 | Corfitsen | 141/360 |
| 5,732,840 A | 3/1998 | Foltz | 220/86.2 |
| 5,765,610 A | 6/1998 | Brown | 141/383 |
| 5,829,495 A | 11/1998 | Corfitsen | 141/348 |
| 5,829,619 A | 11/1998 | Gupta et al. | 220/86.2 |
| 6,119,058 A * | 9/2000 | Anderberg | 701/29 |

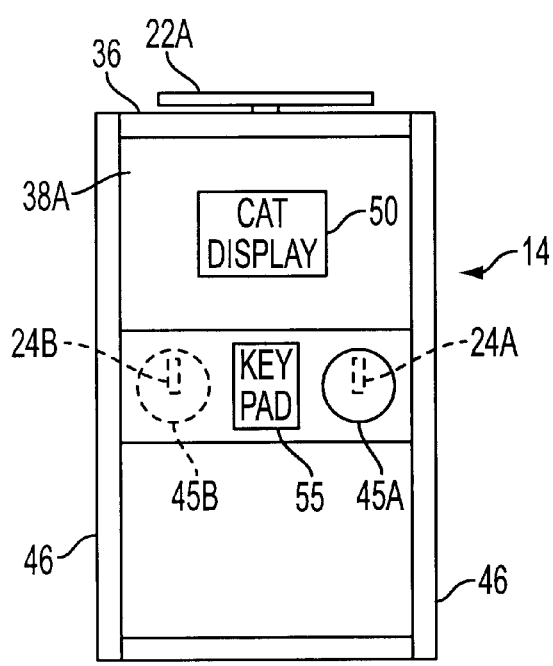
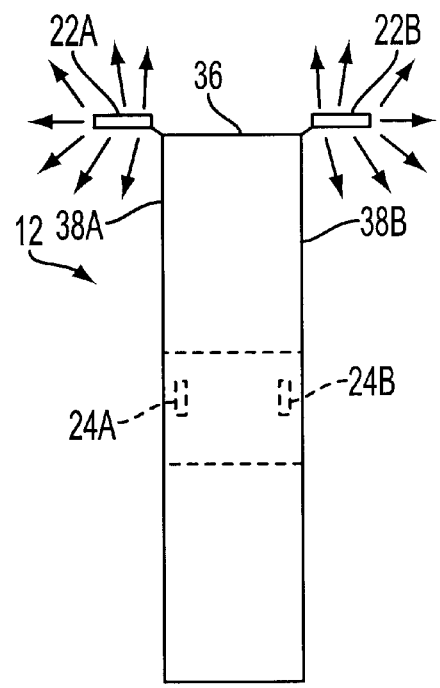
FIG. 4A
FIG. 4B
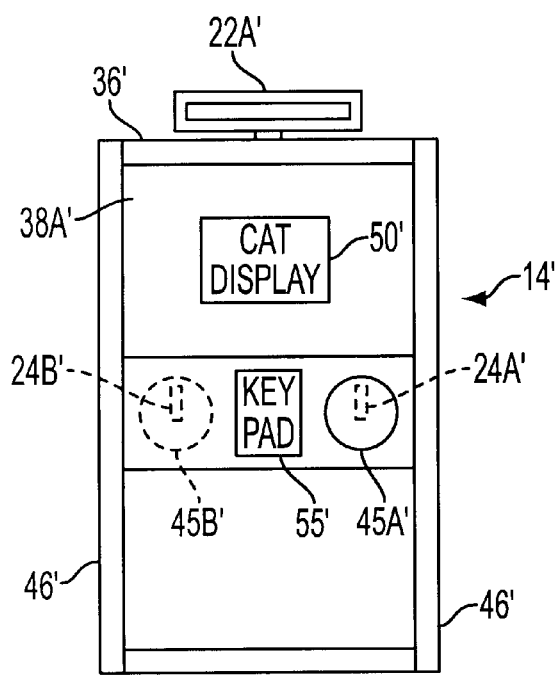
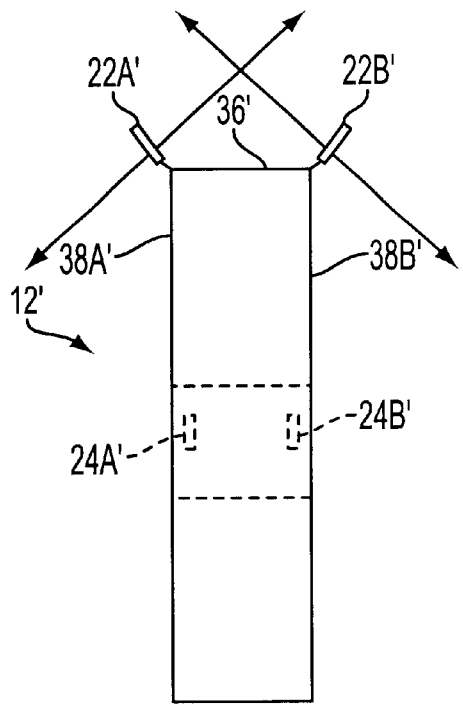
FIG. 5A
FIG. 5B

ROBOTIC VEHICLE SERVICING SYSTEM

BACKGROUND OF THE INVENTION

The present invention is directed to an automated system for conveniently and safely receiving payment authorization and providing servicing to vehicles and their occupants without the need for the occupants to leave the vehicle. More particularly, the present invention involves a fail-safe vehicle servicing system which requires a multi-stage authorization and payment system while retaining control of the actual servicing function so that the vehicle occupants remain in the vehicle during the servicing function.

Large scale use of the automobile and other motorized vehicles has profoundly changed the life style of the population. Large segments of the population can now with ease travel rapidly over expanded distances both for employment and pleasure and more or less at any time of their choosing. This greatly enhanced convenience brought about by the motor vehicle has, however, also resulted in the need to devote time and attention to the maintenance of these motor vehicles including their refueling, washing, or otherwise maintaining the vehicles in the desired condition. The increasing time spent in the automobile has also made establishments specializing in the fueling and maintenance of automobiles convenient retail centers for merchandise not always directly associated with the automobile.

Stopping at establishments which specialize in the goods and services needed to keep motor vehicles functioning is not, however, for most individuals, considered an entertaining or desirable aspect of using a motor vehicle. In particular, stopping for refueling or other vehicle needs, such as washing, is generally considered something of a nuisance.

It is not surprising that attention has been directed to various systems for speeding up and facilitating the servicing of motor vehicles as well as to attending more efficiently to some of the needs of the occupants of the motor vehicles. Primarily, this attention has been directed to the development of more efficient and speedier techniques for refueling motor vehicles.

Initially, a great number of service stations in the United States converted over from being full service facilities where attendants fueled the car, checked the oil and other fluids, and washed the wind shield to self service facilities in which the customer was required to get out of his vehicle and attend to these matters himself with payment being accepted at a remote location. While such self service facilities have been widely accepted, in part at least because of the reduced cost of the fuel being purchased, this approach has not been without its disadvantages. For one, not all customers find it appealing to have to emerge from their vehicles and attend to even this level of servicing. Further, the entire procedure can be time consuming and otherwise annoying to the motorist in a hurry, and can expose him or her to unwanted attention from passing motorists.

One approach to facilitating and expediting the servicing of motor vehicles at service stations has been the development of the remote, automated system of payment whereby, for example, a card is presented to an automated device located by the fuel dispenser to record and charge to the customer's account the sale of fuel. Such systems, while expediting payment for the fuel, do not contribute to facilitating the actual transfer of fuel into the vehicle. Another system that has been developed uses radio frequency identification technology to automatically identify a customer with little or no customer interaction in order to authorize the sale of product or services to the customer and to subsequently bill the customer account for those products and services. Automated dispensing systems have also come into limited use, particularly in Europe, for automatically dispensing fuel into the vehicle's tank by means of a robotic pump once the vehicle is parked along side the dispenser and appropriate authorization received. Generally, however, while providing a faster and less physically troublesome method for payment and delivery of fuel and other services to a motor vehicle, these systems have had several disadvantages. In some cases, the customer is still required to physically emerge from the vehicle and to perform the actual function of fueling his vehicle along with any other desired service. Additionally, in most instances the customer is required to perform a multitude of functions, and has often retained only limited ability to control the progress of those functions especially at critical points such as when the actual refueling of the vehicle is in progress. Further, the extreme complexity of some systems has not only made their cost prohibitive, but increased the likelihood of failure at one stage or another of the fueling process.

Accordingly, there is a need for a system for servicing vehicles and the occupants of the vehicles that combines the convenience of automated systems with the safety and versatility of customer control over actual automated fuel transfer and other service functions. There is a further need for a system for servicing motor vehicles, which is a fail-safe system that allows intervention of the vehicle occupant in the service function while at the same time providing a convenient, simplified vehicle servicing system that does not require the vehicle occupants to actually emerge from the vehicle or become overly burdened by associated matters such as payment and authorization.

SUMMARY OF THE INVENTION

To achieve these advantages and in accordance with the purpose of the invention, as embodied and broadly described, the invention comprises a system for servicing of a motor vehicle and its occupants that allows the occupant of the vehicle both to initiate and to control remotely the servicing from the vehicle without having to emerge from the vehicle and while retaining control of the actual servicing operation.

In one embodiment, the invention provides a system for allowing the occupant of a vehicle to authorize payment and initiate and control servicing of the vehicle and its occupants from the vehicle comprising a customer identification and processing unit for retaining and transmitting customer identification data and for producing a signal approving servicing of the vehicle and its occupants in response to a first, received identification signal from the vehicle; an automatic servicing unit operatively connected to the identification and processing unit for servicing the vehicle and its occupants upon receipt of a second, authorization signal from the vehicle and the approval signal from the identification and processing unit; a first signal generation means in the vehicle for producing the first, identification signal when the vehicle is within a predetermined range of the identification and processing unit; and, a second, signal generation means controlled by the occupant of the vehicle for producing the second, authorization signal that actually initiates and controls the servicing function.

In one aspect, authorization and identification for servicing and billing for goods and services is transmitted by means of the first signal when the vehicle is within a predetermined distance from the dispensing station. The second separate signal, which is manually controlled by the vehicle occupant, is transmitted to initiate and control the actual servicing once the vehicle is parked in the appropriate location proximate the dispensing station and the engine is turned off.

In another aspect, alternative authorization and billing are provided for at the dispensing station, either in addition to the first signal or instead of it. It is further provided, in accordance with the invention, that the second, manually controlled signal and the alternative authorization and billing signal at the dispensing station preferably are provided by a single, hand-operated device within the vehicle.

In a further embodiment of the invention, the automatic servicing unit includes an automatic fuel dispenser for supplying fuel to the vehicle which includes means for transferring fuel from bulk storage to an inlet of a fuel tank in the vehicle, the transfer means including a moveable dispensing head and associated nozzle, guidance means for directing the dispensing head and nozzle toward the fuel tank inlet, and engagement means for engaging and disengaging the nozzle and the fuel tank inlet.

In still another embodiment of the invention, a method is provided for safely and efficiently providing for payment and servicing to a motor vehicle and its occupants in which the occupant of a vehicle initiates and controls payment authorization and servicing of the vehicle and its occupants from the vehicle. The method comprises the steps of generating a first signal by positioning the vehicle within a predetermined range of the identification and processing unit, transmitting customer identification data by means of a customer identification and processing unit that produces an approval signal approving servicing of the vehicle and its occupants in response to the first signal from the vehicle initiating a second authorization and control signal from the vehicle to commence actual servicing, and servicing the vehicle and its occupants upon receipt of a second authorization and control signal from the vehicle and the approval signal form the identification and processing unit.

In further embodiments, the servicing provided in accordance with the invention may include, in addition to fueling the vehicle, other services such as washing the vehicle, providing merchandise to the vehicle occupants, and providing various information to the vehicle occupants, for example, answers to inquiries regarding directions and accommodations.

Additional features and advantages of the invention will be set forth in the description which follows, and in part will be apparent from the description or may be learned by practice of the invention. The objectives and other advantages of the invention will be realized and attained by the apparatus particularly pointed out in the written description and claims hereof as well as the appended drawings.

It is to be understood that the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute apart of this specification, illustrate several embodiments of the invention and together with the description serve to explain the principles of the invention.

FIG. 4A is a side view of a dispenser used with the system of FIG. 1.

FIG. 4B is an end view of the dispenser of FIG. 4A.

FIG. 5A is a side view of another embodiment of a dispenser used with the system of FIG. 1.

FIG. 5B is an end view of the dispenser of FIG. 5A.

DETAILED DESCRIPTION OF THE INVENTION

In accordance with the invention, a dual stage, fail-safe, automated system and method are provided for conveniently allowing the occupant of a vehicle to pay for, initiate and control servicing of the vehicle and its occupants from the vehicle. The invention comprises identification data. The customer identification and processing unit approves payment and servicing of the vehicle and its occupants in response to a first signal from the vehicle. The first signal is initiated as the vehicle approaches the customer identification and processing unit or on arrival next to the unit. The first signal is generated by a vehicle mounted or hand-held control device. The invention also comprises an automatic servicing unit operatively connected to the identification and processing unit to service the vehicle and its occupants once the vehicle is positioned and upon receipt of a second signal from the vehicle following approval from the identification and processing unit. The second signal is entirely controlled from within the vehicle by the occupant of the vehicle. Preferably, the second signal also is initiated by a hand-held or vehicle-mounted device. The first and second signal generation means may also be in a single unit. Included within the servicing contemplated by the invention are various activities in connection with the vehicle itself such as fueling and washing, as well as providing merchandise to the vehicle's occupants.

Reference will now be made in detail to the present preferred embodiments of the invention, examples of which are illustrated in the accompanying drawings.

Figure 1:
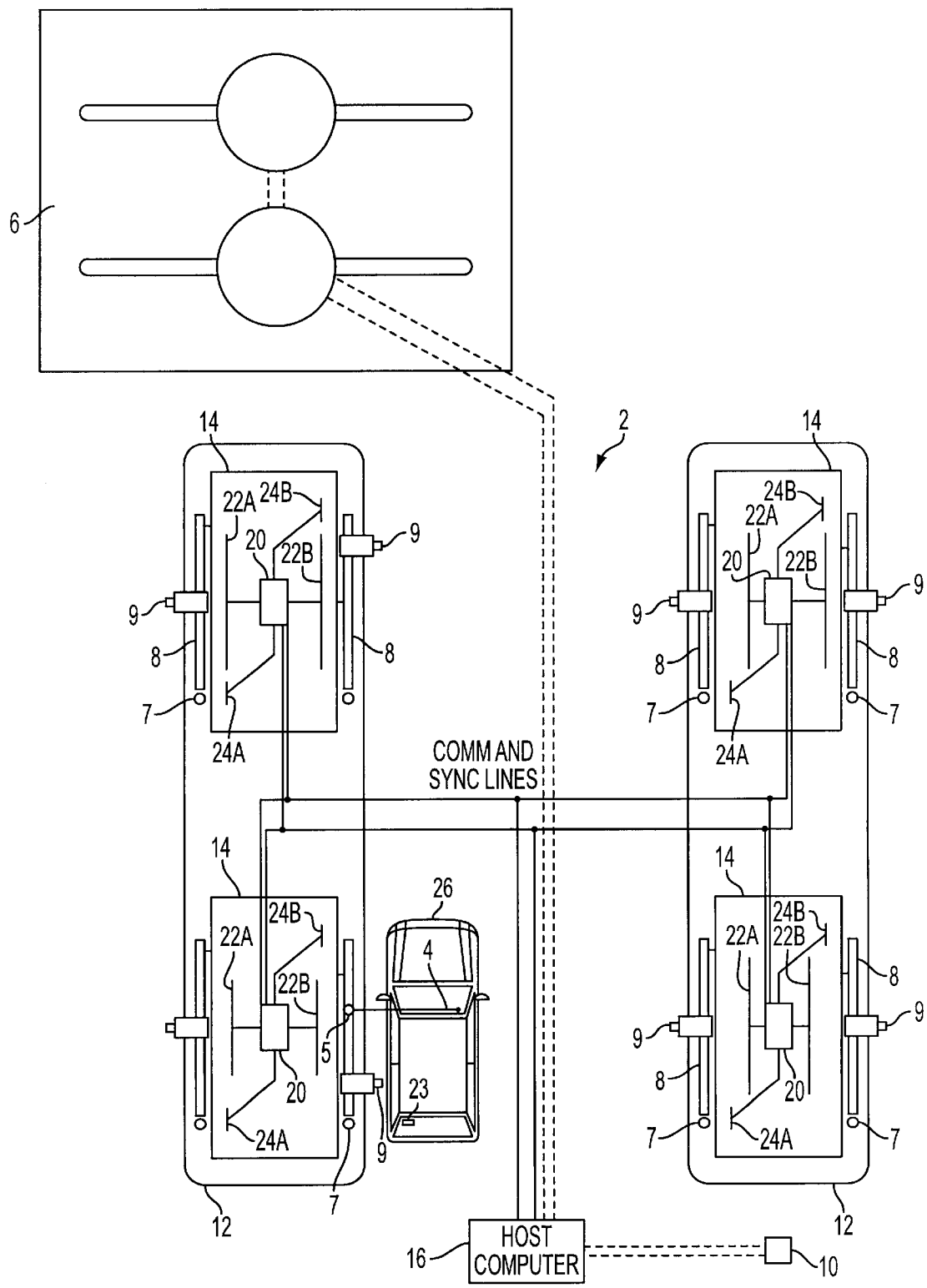
FIG. 1 is a schematic block diagram illustrating an overhead view of a service station equipped in accordance with the present invention.

In FIG. 1, reference numeral 2 refers to a vehicle and customer servicing system embodying features of the present invention. The system 2 initially electronically identifies a vehicle 4 when the vehicle 4 is within a predetermined distance of the station, authorizes a transaction involving the purchase of goods or services by a customer within the vehicle 4, and subsequently bills or authorizes billing the customer's account for the services and goods. The system 2 then allows customers to pump fuel from a robotic pump 9 or secure other services without having to leave the vehicle roll down a vehicle window, or inside the service station building to pay for the fuel or other goods or services. As explained further below, the system 2 may also be used for other services at the station such as a car wash station or facility 6, or for obtaining merchandise from a convenience store 10.

In one embodiment (FIG. 1), the system 2 is implemented in a service station environment that includes two service islands 12, each having two dispensers 14, it being understood that the number of islands and pumps, as well as their geometry and relationship to one another, may vary according to the requirements of the environment. Communication and synchronization lines, discussed more fully below, connect the dispensers 14 to a host computer 16 for controlling operation of the dispensers and to car wash station 6. An additional site 10, representing a food service, payment station or other amenity, is also connected to the computer 16. It is understood that each of the dispensers 14 includes a dispensing area on each of the opposing sides of the dispenser, each of which has at least one robotic fuel pump 9 mounted on rail or track 8 for positioning relative to the vehicle and a customer activated terminal (CAT) (not shown) and for performing dispensing functions as well as the functions to be described in detail below. It is also understood that the computer 16 may be connected to a network (not shown) for performing functions including, but not limited to, customer billing verification. Proper positioning of the vehicle relative to the fuel pump 9 is determined by a vehicle sensor 7 which is connected to the computer 16. As discussed below, robotic pump 9 can be provided with appropriate sensors to locate the fuel port on the vehicle. Further details relating to the robotic fueling pump of the invention are described in U.S. Pat. Nos. 5,638,875 and 5,393,195, both to Corfitsen and both incorporated herein by reference.

Customer Identification Processing Units

Radio frequency customer identification processing units (PU) 20 are included with each of the dispensers 12 and with the site 18 (not shown). Connected to each PU 20, and mounted to each fuel dispenser 14, are four antennas: two (2) long-range antennas 22A, 22B mounted to the top of the dispenser 14 (on each opposing side thereof) for detecting vehicle-mounted customer transponders 23 for producing a first, automatically generated identification signal, and two (2) short-range antennas 24A, 24B mounted inside the head of the dispenser 14, one on each side of the dispenser, for detecting hand-held customer transponder 25 when used essentially at the dispenser site. As discussed in detail below, each PU 20 polls the four antennas 22A, 22B, 24A, 24B of each dispenser 14, sending power pulses to the antennas, reading the customer identification (CID) data detected by the antennas from the transponders (e.g., the transponders 23 or 25) and sending the data to the host computer 16. For example, it is contemplated that a vehicle 26 entering a dispensing area in front of one of the fuel dispensers 14 will include a transponder 23 mounted thereto such that the long-range antenna 22B on the dispenser 14 nearest the vehicle will read the CID data contained in the transponder.

Transponders 23, 25, and antennas 22A, 22B, 24A, 24B, and PU 20 used in the system 10 are available from Texas Instruments Incorporated of Dallas, Tex. under the TIRIS™ (Texas Instruments Registration and Identification Systems) product line. Information about these components is publicly available from Texas Instruments Incorporated and should enable those of ordinary skill in the art to make and use the system 10, following the description set forth in this specification to achieve desired functionalities.

The transponder 23, 24, and radio frequency identification tags (RFID tags) that may either be mounted to the customers' cars or may be hand-held, key ring/chain or credit card style units. The transponders 23 and 25 contain customer identification (CID) data that is broadcast in response to receiving a predetermined radio frequency ("RF") wave (i.e., a power pulse). The RF wave is sent by a PU 20 housed in one or more of the dispensers 14. The antennas 22A, 22B, 24A, 24B mounted to the dispensers 14 read the broadcast data and send the data to the PU 20 for decoding and further transmission to the host computer 16 or also to a network where the data can be verified and the customer billed after completion of the fueling or other purchase.

The processing units 20 send out periodic, low frequency, power pulses of approximately 134.2 kHz to the antennas 22A, 22B, 24A, 24B. The antennas 22A, 22B, 24A, 24B in turn direct the electromagnetic fields generated by the power pulses to particular areas adjacent the dispensers. A power pulse lasts approximately 50 milliseconds (ms) and may be generated every 90 ms to 140 ms.

When a transponder 23, 25 enters the electromagnetic field, the energy is collected by an antenna (not shown) in the transponder and stored in a small capacitor (also not shown). After the power pulse is completed, the transponder 23, 25 transmits the customer identification data using the energy stored in the capacitor. The antennas 22A, 22B, 24A, 24B mounted to the dispensers 14 read the data broadcast from the transponder 23 or 25 and send the data to the PU 20 for decoding and further transmission to the host computer 16 or a network where the data can be verified and the customer billed after completion of the fueling or other purchase.

Figure 2:
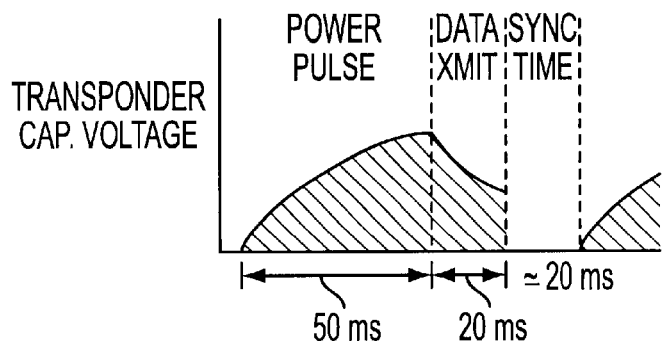
FIG. 2 is a graph plotting transponder capacitor voltage with respect to time for a transponder used with the system of FIG. 1.

FIG. 2 graphically illustrates the operation of a transponder 23 or 25 in cooperation with a reader 20. Responsive to a PU 20 emitting a power pulse (typically occurring for 50 ms), the transponder 23 or 25 (if within range) will be charged as indicated by the increase in the voltage potential of its capacitor (not shown). Once charged, the transponder 23 or 25 then emits a response signal (lasting about 20 ms)

thereby sending its customer identification data to the PU 20. In total about 128 bits are transmitted which are picked up by the antenna (e.g., one of antennas 22A, 22B, 24A, 24B) of the PU 20 and then are decoded. Once the data has been sent, the transponder 23 or 25 continues to discharge its storage capacitor thereby resetting the transponder to make it ready for the next read cycle. The period between the transmission pulses is known as the "sync time" and lasts for about 20 ms, depending upon the chosen criteria. The next power pulse may be transmitted approximately 20 ms to 50 ms after the transponder 23 or 25 has completed transmitting the data. As explained further below, the sync time between pulses is used to coordinate the transmission of the power pulses through the various antennas 22A, 22B, 24A, 24B of the system 10.

Referring again to FIG. 1, it is understood that the illustration is not necessarily drawn to scale. Each fuel dispenser 14 can have two separate dispensing areas, one on each side of the dispenser 14, where the fuel nozzles and registers are located. As indicated above, each dispensing area typically also has a customer activated terminal ("CAT") that a customer uses to make selections such as type of payment and where messages may be displayed to the customer. Other possible arrangements of the system 2 include environments with more than two service islands, not necessarily parallel to one another, or arrangements in which the islands form a circle with inner and outer rows or islands.

Figure 3A:
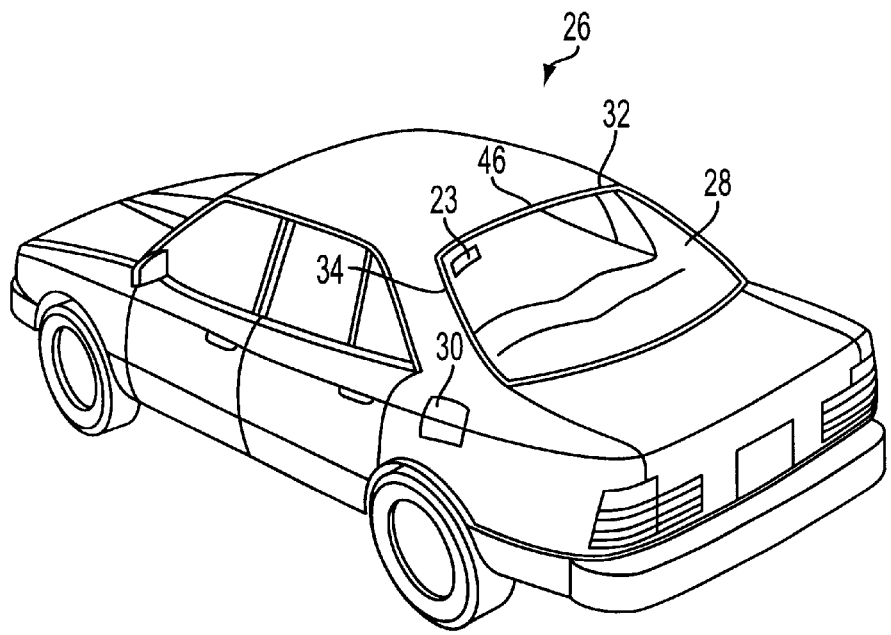
FIG. 3A is a partial rear perspective view of a vehicle illustrating the placement of a vehicle-mounted transponder used with the system of FIG. 1.

Referring to FIG. 3A, the vehicle-mounted transponder 23 may be mounted to the rear window 28 of the vehicle 26 preferably near the side of the vehicle where the fuel door 30 is located. In FIG. 3A, the vehicle-mounted transponder 23 is positioned approximately two (2) inches from the top 32 and side 34 edges of the rear window glass. The vehicle-mounted transponder 23 may be applied to the window 28 with adhesive-backed VELCRO® pads. One pad is adhered to the transponder 23 and another is adhered to the inside surface of the vehicle window 28. Although the vehicle-mounted transponder 23 has been described herein as being positioned on the rear window 28 of the vehicle 26, other locations such as a side window may be suitable depending upon the particular arrangement of the long-range antennas 22A, 22B. Furthermore, other means for mounting the transponder 23 to the vehicle may be used.

Figure 3B:
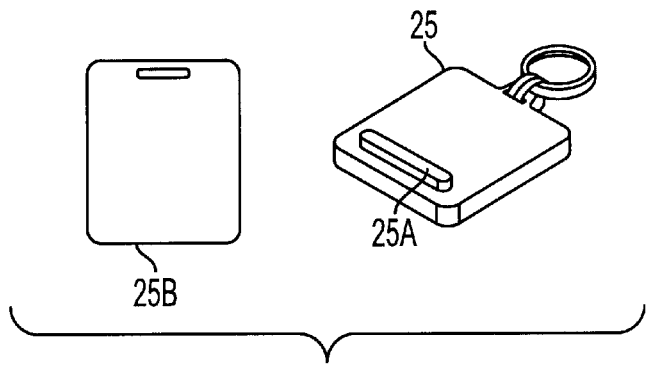
FIG. 3B illustrates a card hand-held transponder and a key ring hand-held transponder used with the system of FIG. 1.

FIG. 3B illustrates two variations of a hand-held transponder 25 which a customer can wave in front of one of the short-range antennas 24A, 24B mounted on the opposing sides of the dispenser 14. The hand-held transponder 25 may be a key ring or chain style unit 25A or a credit card style unit 25B, or have a different suitable hand-held form. Variations in the shape and size of the transponder 25 are contemplated.

FIGS. 4A and 4B illustrate a mounting arrangement for the four antennas 22A, 22B, 24A, 24B on a dispenser 14. The two long-range antennas 22A, 22B, are preferably mounted to a top 36 of the dispenser 14. One long-range antenna 22A or 22B extends outwardly from each side 38A or 38B of the dispenser 14 so that the plane of the antenna is substantially perpendicular to the side 38A or 38B of the dispenser 14. The antennas 22A, 22B transmit equally well from either side of the antenna, perpendicular to the plane of the antenna. The antennas 22A, 22B, therefore, are aligned so that the electromagnetic field generated from one side of the antenna is directed toward the dispensing area for a vehicle on the appropriate fueling side of the dispenser 14, and the electromagnetic field from the other side of the antenna is directed up and away from the other side of the dispenser 14 as shown.

The top 36 of the dispenser location provides the optimum performance for reading vehicle-mounted transponders 23. This location and orientation of the long range antennas 22A, 22B also eliminates any problems associated with reading a vehicle-mounted transponder 23 of a vehicle located on the opposite side oil the dispenser 14. Furthermore, with this location and orientation, the radio frequency waves are less likely to reach the fueling areas of adjacent service islands 12.

The short-range, or key ring/credit card style transponder antennas 24A, 24B are preferably mounted within the dispenser 14 head behind corresponding authorization lights 45A, 45B. The authorization lights 45A, 45B advise the customer that he or she is authorized to pump fuel. One short-range antenna 24A or 24B is positioned on either side 34A or 34B, respectively, of the dispenser 14 as shown in FIG. 2B. The antennas 24A, 24B are also positioned near opposing ends 46 of the dispenser 14 as shown in FIG. 2A. This positioning of the antennas 24A, 24B helps prevent the reading of transponders from the wrong side of the dispenser 14. In another embodiment, the authorization lights 45A, 45B can be located apart from the dispenser 12 or in different locations on the dispenser.

FIG. 4A also shows the customer-activated-terminal ("CAT") on the dispenser 12. The CAT includes a display 50 where messages may be presented to the customer.

FIGS. 5A and 5B illustrate a second possible arrangement of the antennas on the dispensers. In this embodiment, the long-range antennas 22A', 22B' are mounted to the top of the dispenser 14' and extend outwardly from the sides 38A', 38B' of the dispenser 14' at an upward angle as shown in FIG. 5B. The electromagnetic fields are directed from one side of the antenna toward the appropriate fueling area and are directed up and away from the other side. The short-range antennas 24A', 24B' of this embodiment are arranged in a similar manner as the short-range antennas of the first embodiment.

The transponders 23 and 25 may be read only (R/O), low frequency RFID tags containing a 64-bit customer identification code and are available from Texas Instruments, Inc. Alternatively, the transponders 23, 25 may be read/write (R/W), low frequency RFID tags with a range of different memory capacities. Such R/W transponders are available from Texas Instruments, Inc. The customer identification codes (CIDs) on the RIW transponders may be changed or other data added for business and/or security purposes. For example, the number of times in a day that a vehicle-mounted transponder is used for a fueling transaction at a particular service station or locality can be tracked and written to the transponder 23, 25. This information can be used for various reasons including limiting the number of times that a vehicle-mounted transponder can be used in a day. Furthermore, personal preference information related to the buying experience may be written to the transponder. Likewise, the transponder can be connectable by a suitable interface to microprocessors such as a vehicle's on-board computer so that, in cooperation with the system 10, information can be written to the transponder and then displayed to the customer while fueling (e.g., fuel economy calculations, miles traveled since last fill up, engine conditions and the like).

The actual reading range or distance for the antenna/transponder combinations depends upon such criteria as transponder size and type, antenna size and type, transponder and antenna orientation, and electromagnetic noise. A combination of a long-range antenna 22A or 22B mounted to the top of the dispenser 14 and a vehicle-mounted customer transponder 23 preferably provides a read range of up to approximately seven (7) feet measured from the side face of the dispenser 14. The combination of a short-range antenna 24A, 24B located in the dispenser 14 head and a key-ring or credit card style customer transponder 25 preferably provides a read range of four (4) to six (6) inches.

Table 1 below shows preferred read ranges for the vehicle-mounted transponder/antenna combination and the key chain/credit card transponder/antenna combination in one embodiment.

TABLE I

| Transponder Type | Read Range[a] | |
|---|---|---|
| | On Side | Off Side |
| Vehicle Mounted | Depth[b]:<br>Minimum: 60 inches<br>Ideal: 84 inches<br>Width: 42 to 60 inches<br>Height[c]: 39 to 60 inches | 18 inches |
| Key Chain/Credit Card | Bezel surface to 4 to 6 inches[d] | No reads allowed |

Figure 6A:
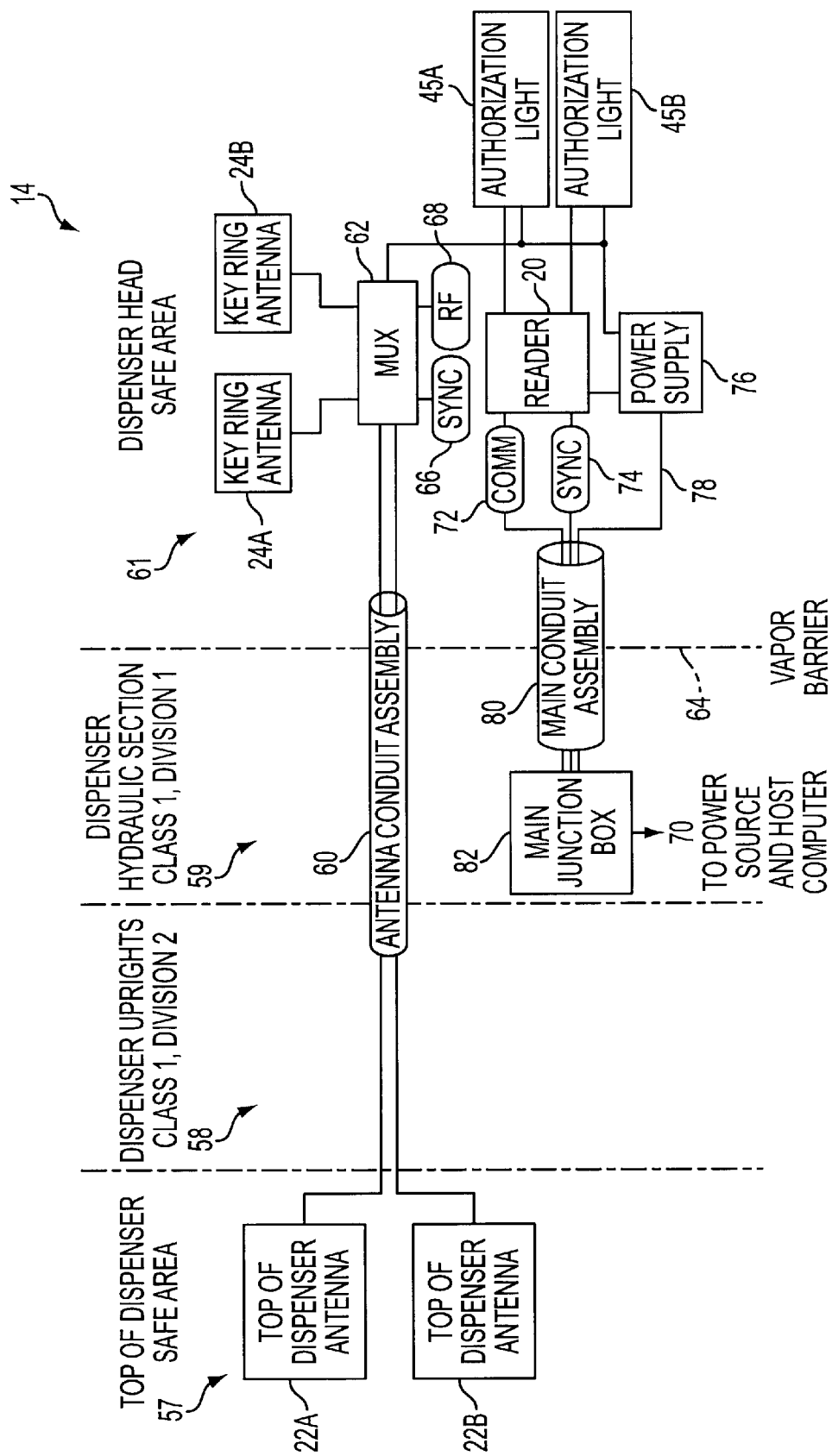
FIGS. 6A and 6B are schematic block diagrams illustrating components of a dispenser for connection to a host computer used with the system of FIG. 1.

[a]Measured from bezel surface
[b]Measured perpendicular to the side of the dispenser
[c]Measured from the base of the dispenser
[d]Measured perpendicular to the side of the dispenser FIG. 6A is a schematic block diagram illustrating hardware details of a dispenser 14 for the system 10. The two long-range antennas 22A, 22B (each labeled as "TOP OF DISPENSER ANTENNA") are mounted to the top 36 (FIG. 4A) of the dispenser 14 in a "safe area" 57. An antenna conduit assembly 60 extends through 25a "dispenser uprights" section 58 and a "dispenser hydraulic" section 59 to a "dispenser head safe area" 61 for connecting the long-range antennas 22A, 22B to a multiplexer 62 ("MUX"). The multiplexer 62 is housed in the dispenser head safe area 61 along with the PU 20. The dispenser head safe area 61 is separated from the hydraulic section 59 by a vapor barrier 64.

Also housed in the dispenser head safe area 61 and coupled to the multiplexer 62 are the short-range antennas 24A, 24B (each labeled "KEY RING ANTENNA"). The multiplexer 62 controls the transmission of the energy pulses from the antennas 22A, 22B, 24A, 24B. A synchronization ("SYNC") line 66 provides the coordination commands to the multiplexer 62 for transmitting power pulses. A radio frequency ("RF") line 68 provides the low frequency, FM power pulses that are transmitted by the antennas 22A, 22B, 24A, 24B.

The multiplexer 62 and PU 20 are both coupled to the authorization lights 45A, 45B for controlling the activation of the lights. The PU 20 is coupled to the host computer 16 (FIG. 1A) via a communications ("COMM") line 72 and to the other readers 20 via a synchronization ("SYNC") line 74. A power supply 76 housed in the dispenser 14 head provides power to the PU 20, the multiplexer 62 and the authorization lights 45A, 45B. The power supply 76 is also coupled to an outside power source via a power line 78. A main conduit assembly 80 (labeled "ASSY") supports and protects the communication line 72, the sync line 74, and the power line 78 which are fed to a main junction box 82 coupled to the power storage source and the host computer 16.

Figure 6B:
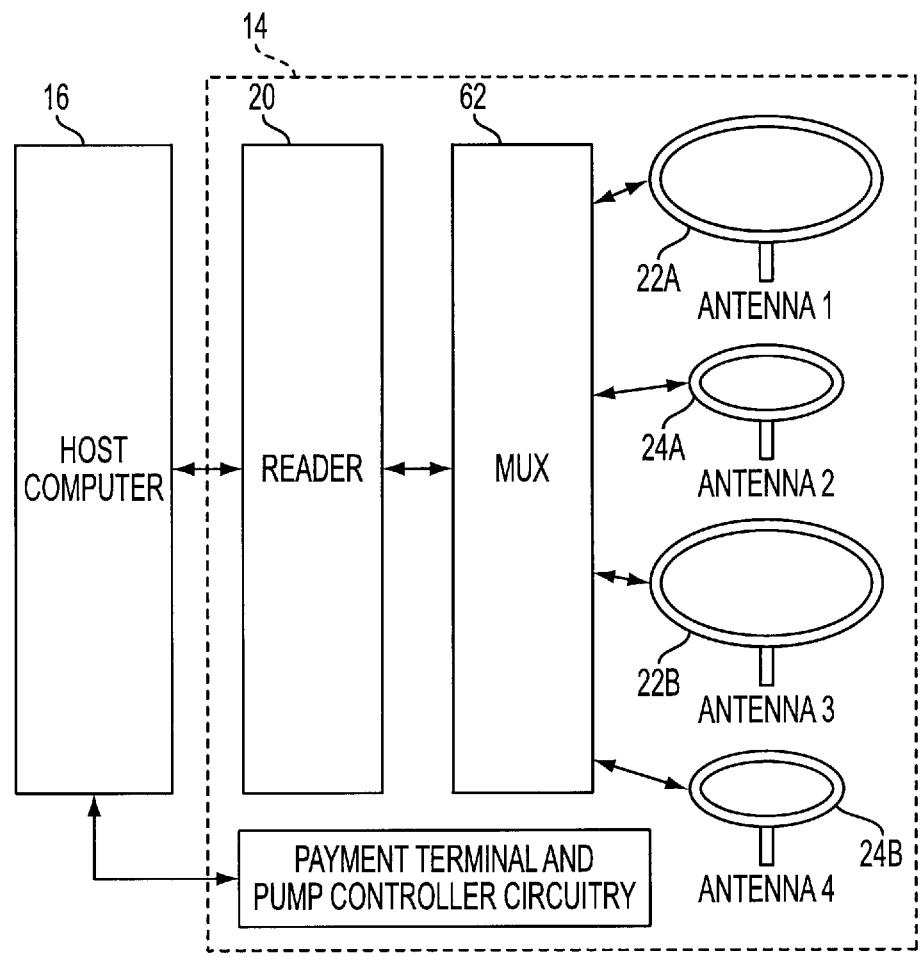

FIG. 6B is a schematic illustrating the signal flow between the host computer 16, the dispenser 14 and the antennas 22A, 22B, 24A, 24B connected to the antennas through the MUX 62. Each PU 20 includes a microprocessor (not shown) and programming instructions (i.e., software, not shown) for causing the power pulses to be generated by the antennas 22A, 24A, 22B, 24B through the channels of the MUX 62 that connect each antenna to the reader. To be properly synchronized, for reasons described below, all of the processing units 20 in the system 10 must cycle through the MUX 62 channels to activate the antennas 22A, 24A, 22B, 24B attached thereto in a predefined, coordinated sequence. For example, in the illustrated embodiment each PU 20 includes a MUX 62 with four channels wherein each channel 1–4 is connected to a different antenna 1–4 (e.g., antennas 22A, 24A, 22B, Synchronized operation, as explained below, therefore requires that all of the PU 20 generate a charge pulse on channel 1 at the same time, on channel 2 at the same time, on channel 3 at the same time and on channel 4 at the same time. If one reader generated a charge pulse on channel 1 while another PU 20 generated a charge pulse on channel 3, or if the PUs 20 each operated to generate pulses on any of the channels independently of the other readers, then the readers would be out of synchronization. To keep all of the PUs 20 in synchronization, the sync line 74 (FIG. 6A and 7) connected to each of the PUs 20 instructs the MUX 62 in each reader (through the sync line 66) when to generate a charge pulse and on what channel to generate it.

FIG. 6A further illustrates the communication between payment terminal and pump controller circuitry 15 and the host computer 16. The payment terminal may be a customer activated terminal (CAT) and the pump controller circuitry responds to instructions from the host computer 16 and the payment terminal for dispensing fuel from the dispenser 14.

Figure 7:
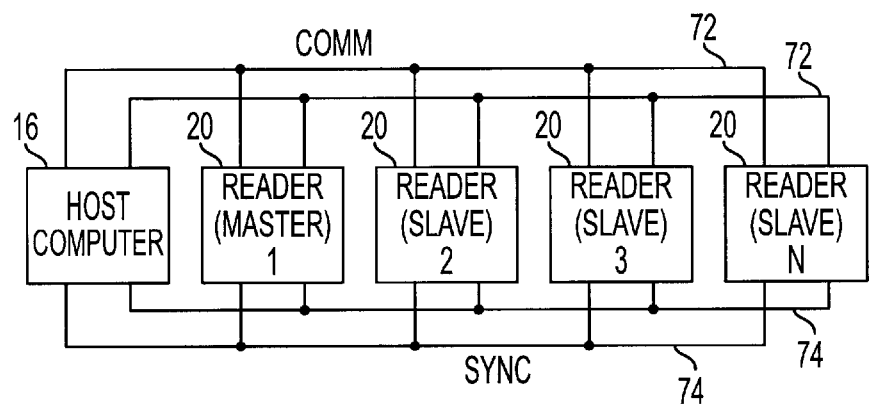
FIG. 7 is a schematic block diagram of the site wiring between readers and the host computer of the system of FIG. 1.

FIG. 7 further illustrates the site wiring for the system 10 showing the communication line 72 and sync line 74 connections among the multiple PUs 20. The timing signals for coordinating the transmission of power pulses from PUs 20 (labeled with numbers 1, 2, 3 and n) are carried by the sync line 74. The coordination of the transmission of the power pulses from the various PUs 20 is discussed further below. Any number of the PUs 20 is contemplated. While not shown, it is understood that each PU 20 includes a radio frequency module and a control module. The radio frequency module generates the power pulses and receives the data broadcast from the transponders 23, 25. The control module has a microprocessor that decodes and processes the transponder data and communicates with the host computer 16.

Preferably, the PUs 20 are interconnected on an RS-485 loop to provide synchronization of the transmit/receive cycle. This link ensures that all dispenser 14 locations are activating like antenna positions to minimize interference from each other, as described below. While not shown, RS 232-485 converters interconnect the host computer 16 with the PUs 20.

Synchronization of the Readers

Figure 8:
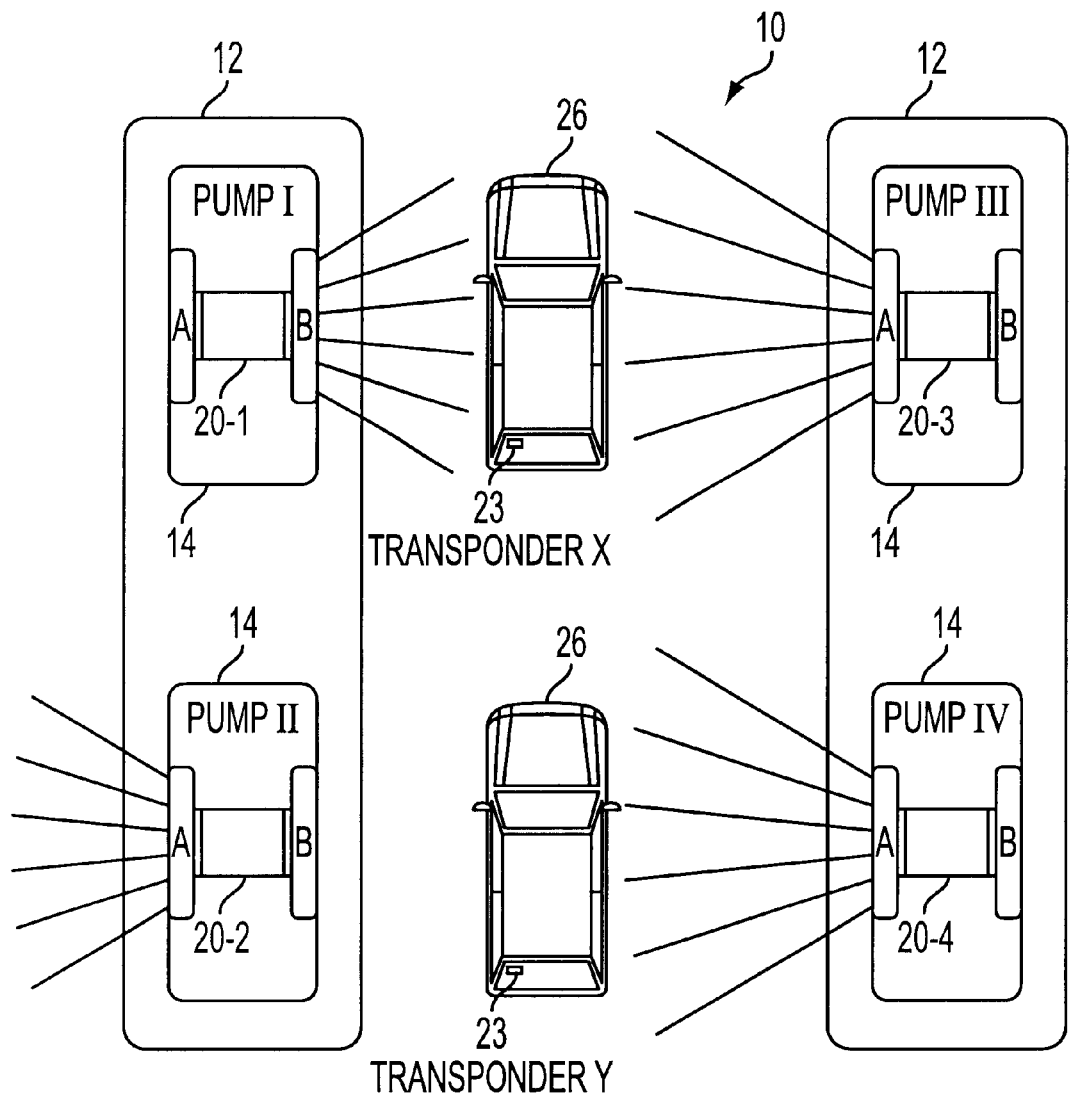
FIG. 8 is a schematic representation of a service station environment and the arrangement of dispensers therein illustrating a reader synchronization strategy for the system of FIG. 1.
Figure 9:
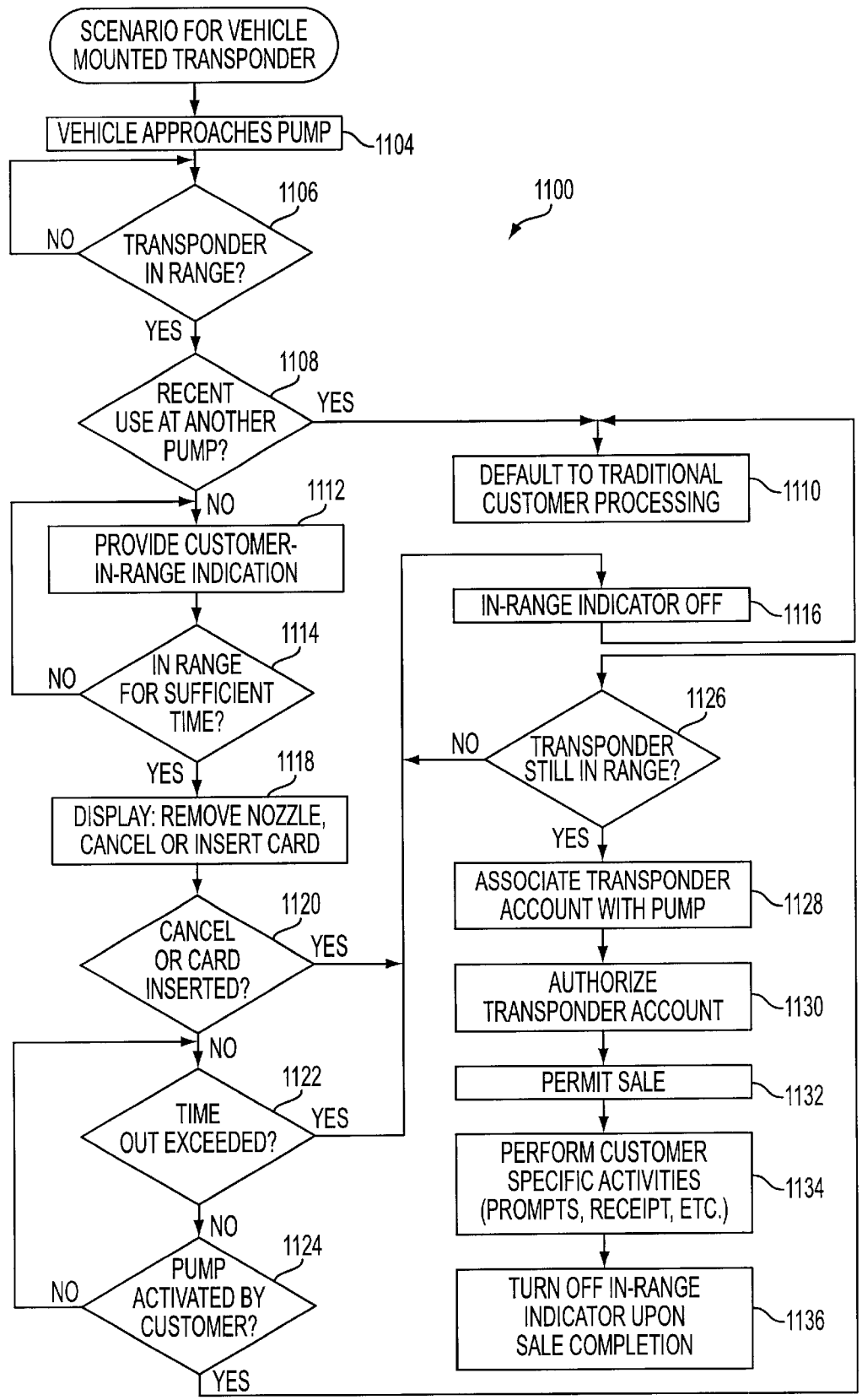
FIGS. 9 and 10 are flowcharts illustrating the user operation of the system of FIG. 1.
Figure 10:
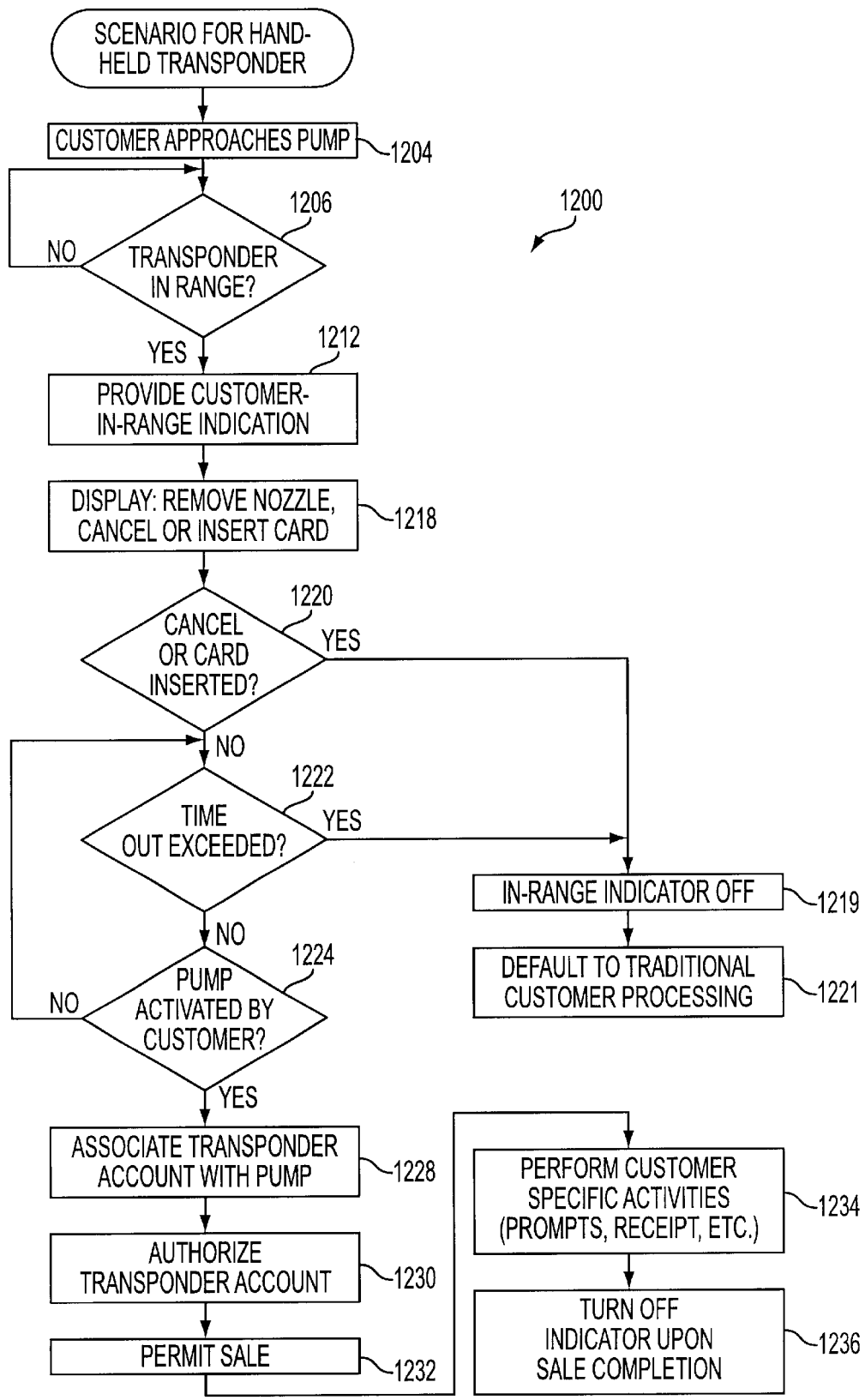
Figure 11:
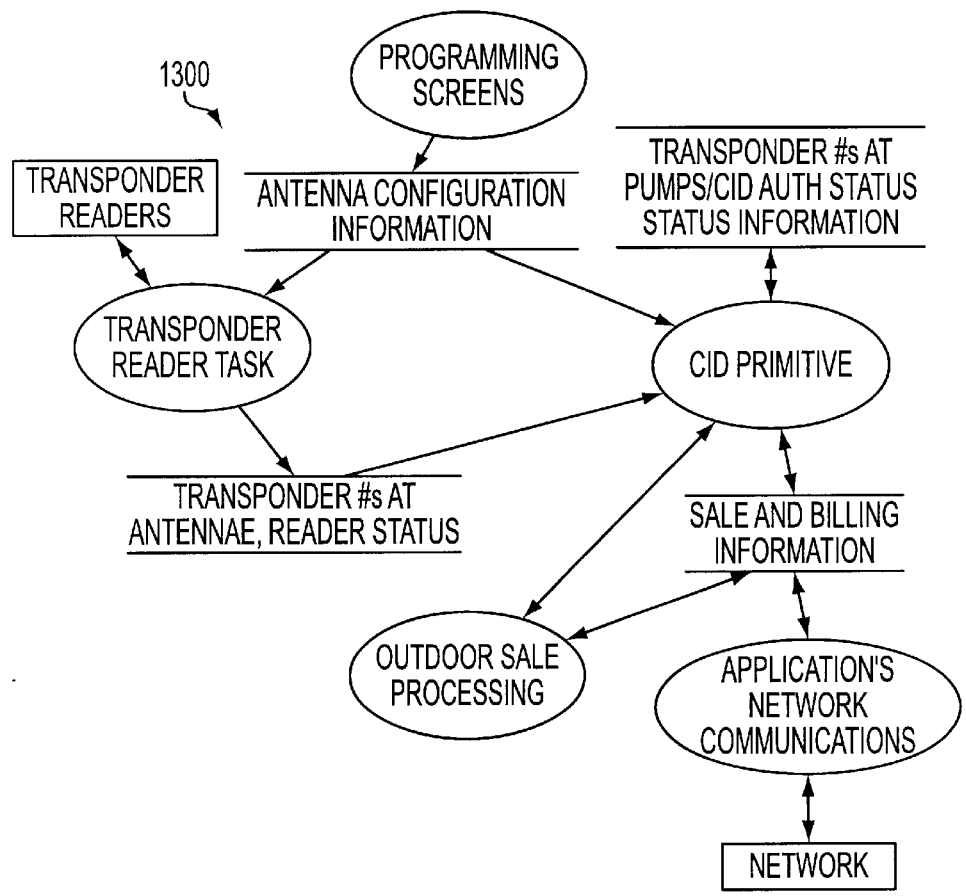
FIG. 11 is a diagram illustrating the major software tasks and subsystems involved in the handling of a customer identification (CID) transaction for the system of FIG. 1.
Figure 12:
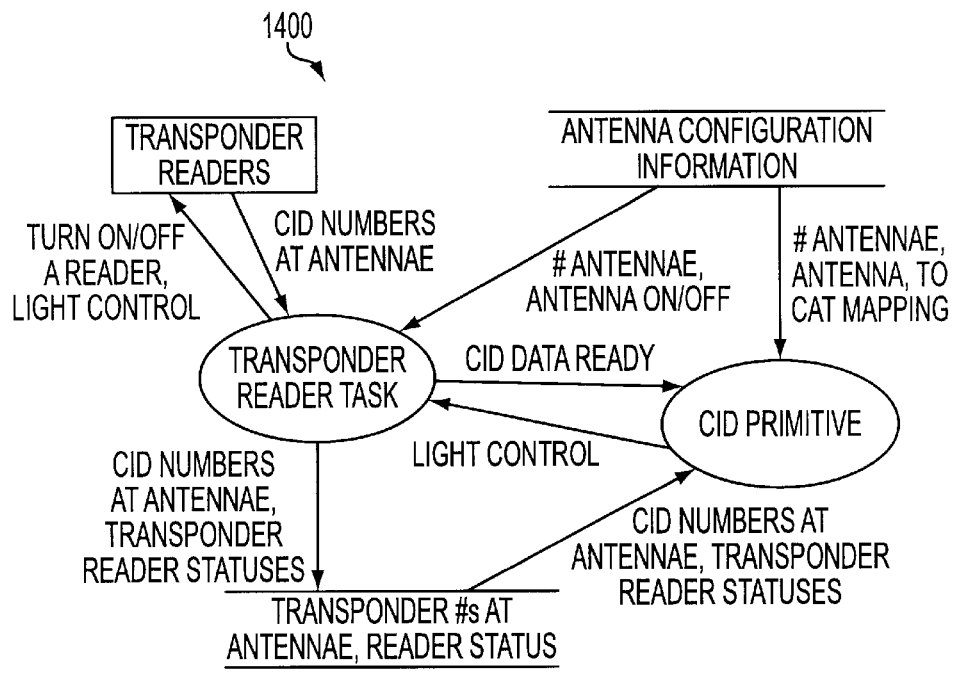
FIG. 12 is a diagram illustrating the Transponder Reader Task's Data Flow for the system of FIG. 1.
Figure 13:
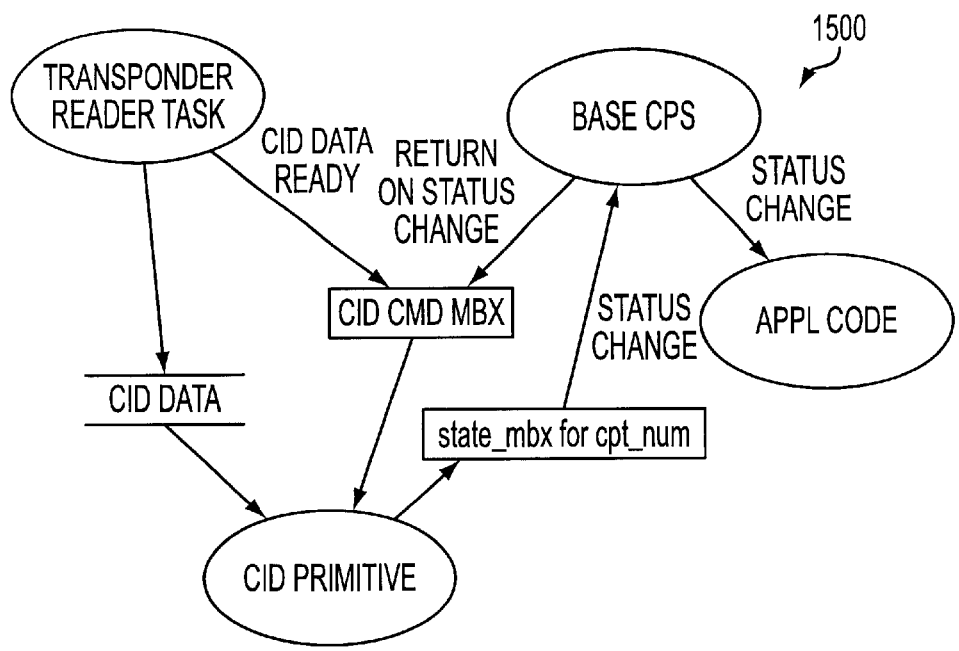
FIG. 13 is a diagram illustrating the Return on Status Change interface for the system of FIG. 1.
Figure 14:
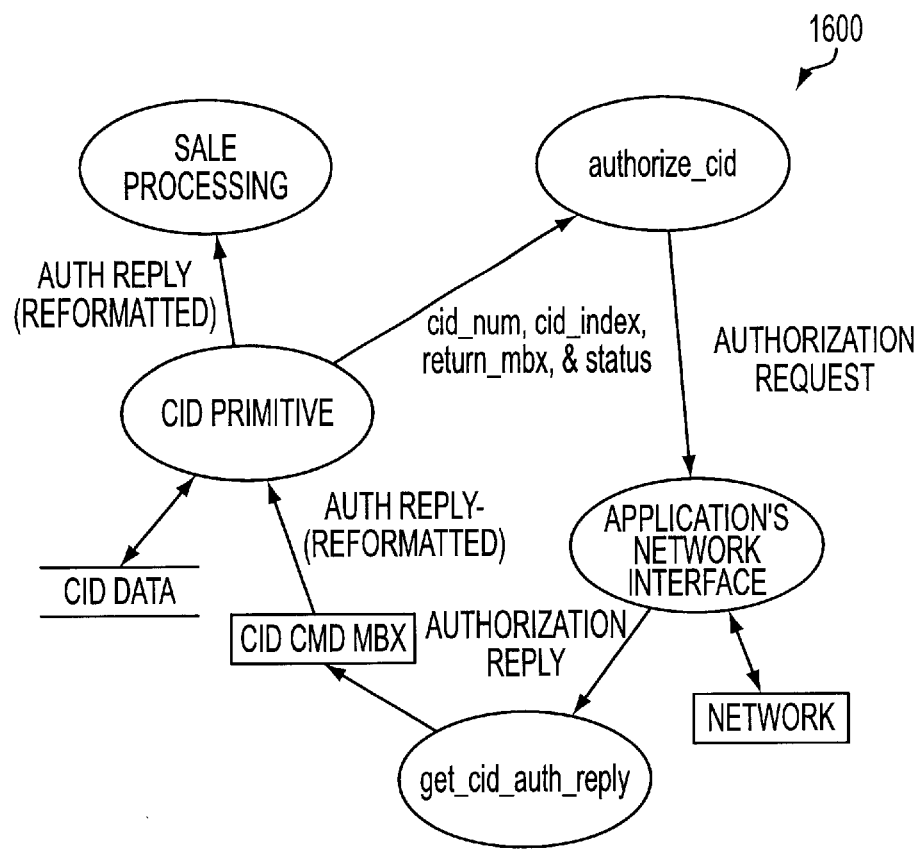
FIG. 14 is a diagram illustrating the Authorization Request and Reply Handling for the system of FIG. 1.

FIGS. 8–10 illustrate details concerning synchronization of the readers 20 within the system 10 to avoid crosstalk among the transponders 23 that could result in erroneously billing a customer for services never received.

In FIG. 8, a simplified schematic of the system 10 is shown in which the dispensers 14 are labeled as pumps I, II, III, and IV and have corresponding PUs 20-1 to 20-4, each with antennas A and B on opposite sides of the pump. To illustrate the crosstalk problem, the readers in pumps I and III are unsynchronized thus demonstrating the potential for crosstalk caused by a transponder X being charged by one of the readers when the transponder X is located between the pumps. In contrast, the readers in pumps II and IV are synchronized thus solving the crosstalk problem for a transponder Y located between the pumps.

Pumps I and III send out power pulses from antennas B and A, respectively, thereby causing the potential for one or both of them to charge the transponder X, even though the transponder X is closer to pump I. Each of the antennas B and A emitting power pulses generate an energy field extending from the antenna, as represented by lines in the figure. The energy field in front of each antenna includes a "near field" region, a "far field" region, and a "transition zone" therebetween (not shown). There are no sharp dividing lines between the three regions and somewhat arbitrary limits are set for each region based upon the way in which energy spreads as the distance from the antenna increases. In one example, the near field region generally extends out from the antenna to a distance of $11D^2/82=A/22$ where $D/$=the diameter of the antenna, $A/$=area of antenna aperture, and $\lambda$=wavelength. The distance of the far field region is about five times the length of the near field region and occurs at a distance of roughly $2D/22$. The transition zone is the region therebetween. As shown in FIG. 8, the possibility exists for overlap of the transition zones or far field regions of the antennas B and A for pumps I and III when the antennas emit power pulses simultaneously.

In looking at the power pulses emitted from pumps I and III, it is most likely that the Transponder X will be charged by antenna B in pump I, because the transponder is relatively far from pump III; however, it may end up being charged by the overlap of power pulses from both pumps I and III even in a situation where the transponder is too far from either pump to be charged by antenna B or antenna A alone. This can occur when the energy in the overlapping transition zone or far field regions of the antennas, by virtue of their combined strength, is sufficiently high. Once the power pulses are completed, if the transponder X receives sufficient energy it will transmit its data in response. Even though pump I is closest to the Transponder X, it is possible that pump III will also receive the response, thereby resulting in crosstalk.

Pumps II and IV send out power pulses from their antennas A and B, respectively. Transponder Y is too far away to be charged by the energy field generated by pump IV alone; and it will not be charged by pump II since the power pulse from pump II is not in a direction facing the transponder. Transponder Y will only be charged when it receives a power pulse from antenna B on pump II (which will then be the only antenna receiving a response). Such a synchronized system provides better separation and higher confidence that the proper response is coming from the correct transponder 23.

Thus synchronization of the system 10 is accomplished when the PUs 20 selectively send out power pulses so that all the antennas facing the same general direction (e.g. all antennas facing north, or facing south, or facing east, or facing west) send out a pulse at the same time, and all antennas facing different-directions do not send out pulses at that time. This synchronization is accomplished by the PUs 20 transmitting pulses from antennas facing one direction (e.g., antennas A) during the sync time (see FIG. 2) of the transmit/receive cycle of antennas facing a different direction (e.g., antennas B).

Other synchronization arrangements are possible depending upon the number of pumps and their relationship to one another. In one embodiment, the synchronization does not necessarily need to occur for all antennas but instead will occur only in the case of antennas for dispensing areas that face each other where the energy fields in front of the antennas might possibly overlap.

Referring also to FIG. 1, a synchronization strategy that prevents energy fields from the different antennas from overlapping results when each PU 20 pulses antennas 22A at the same time, followed by antennas 24A at the same time, followed by antennas 22B and the same time, followed by antennas 24B at the same time. The foregoing successive sets of antennas are pulsed during the sync time (or thereafter) following the data transmit cycle of transponders charged by the previous antenna set. In the strategy just described, antennas for car mounted transponders 23 and hand-held transponders 25 alternate in their pulsing, and pulsing only occurs on one side of each island 12 at a time so that a vehicle located between the islands is not subject to receiving pulses from opposite directions caused by overlapping energy fields. In this case, each "A" antenna (antenna 22A or 24A) (facing west as viewed in the drawing) sends out a pulse during the sync time of the transmit/receive cycle of the previously pulsed "B" antenna (antenna 22B or 24B) (facing east as viewed in the drawing), and vice-versa. This represents an antenna pulse sequence of: 22A, 24A, 22B, 24B. Alternative sequences include: 22A, 22B, 24A, 24B. Any other combination thereof is appropriate so long as "A" antennas and "B" antennas do not charge in the same cycle.

Referring to FIGS. 6A, 6B and 7 discussed previously, operation of the readers 20 will now be described in further detail with respect to an implementation of one or more of the synchronization strategies mentioned above.

As indicated previously in FIG. 6B, each PU 20 includes a microprocessor (not shown) and programming instructions (i.e., software, not shown) for causing the power pulses to be generated by the antennas 22A, 24A, 22B, 24B through the MUX 62 channels that connect each antenna to the reader. To be properly synchronized, all of the PUs 20 in the system (FIG. 7) must cycle through the MUX 62 channels in synchronization. Synchronized operation requires that all of the PUs 20 generate a charge pulse on channel 1 at the same time, on channel 2 at the same time, on channel 3 at the same time and on channel 4 at the same time. It is understood that the specific synchronization strategy may be determined based upon which antenna 22A, 22B, 24A, 24B is connected to which channel 1–4. The sync line 74 connected to each of the PUs 20 instructs the MUX 62 in each reader (through the sync line 66) when to generate a charge pulse and on what channel to generate it for purposes of synchronization.

FIG. 7 illustrates how each PU 20 is instructed on the sync line 74 to generate properly synchronized charge/read cycles. One of the PUs 20 is designated as the "master" reader and the remainder are designated as "slaves." The master PU 20 generates a synchronization pulse (represented by sync timing line 900) on the sync line 74 which inversely follows its charge/read cycle (represented by the master timing line 902, wherein a "high" signal is for charge and a "low" signal is for read). The slave PUs 20 use the sync pulse to set up their charge/read timing (represented by slave timing line 904). Assuming the charge pulse is fixed at 50 ms and the transponder read is about 20–25 ms, there should be no reason for variance. However, as illustrated the slave timing line 904 may result in a variance from the sync pulse because of message processing occurring in the slave PU 20. This has the unfortunate effect of changing the slave PU 20 processor's timing by lengthening the time it remains low.

Hence synchronization can be adversely affected depending upon the loading of the individual PU 20, causing a reader to "drop out" of a charge/read cycle if it is unable to finish its processing in time to catch the sync signal.

It will be appreciated that processing routines are written such that message processing does not occur in a manner to inordinately slow down the master PU 20.

Slowing down the master PU 20 is to be avoided since this will slow down the entire system of PUs 20.

Referring to FIG. 7, communications on the comm line 72 between the PUs 20 and the host computer 16 in the present embodiment are limited because the readers are unable to communicate to the host computer during the read cycle, i.e., when the reader is receiving information from the transponders 23, 25. This problem is due, in part, to the lack of hardware resources available in the commercially available PUs 20 (i.e., the TIRUS reader available from Texas Instruments Incorporated).

For example, the PU 20 lacks a universal asynchronous receiver-transmitter (UART) to transmit/receive transponder data. Accordingly, the present embodiment implements a UART in the software (not shown) which is stored and executed within the PU 20. The software causes communications between the host computer 16 and the PUs 20 only when PU 20 is implementing a charge cycle. During the charge cycle, the processor (not shown) in the reader is available for communications on the line 72 while it is waiting for the 50 ms timer to transpire. Subsequently, once the PU 20 has finished charging the transponder 23, 25, it will attempt to read information from it and to do this, serial interrupts must be disabled for at least 20–25 ms. This is not a good time for host computer 16 communications to occur because either the transponder read will be garbled by the interrupt for host computer communications.

The software within the PU 20 implements the UART function by only allowing the host computer 16 to communicate with the PU 20 on the comm line 72 only when the sync line 74 is low, and adjusts the logic of the sync line such that a low sync line is a reliable indicator of when charging is occurring. When the sync line 74 transitions from high to low, the charge cycle for the reader commences. The sync line stays low during charging and the software then instructs the sync line to transition from low to high at the end of the charge cycle. Thus the sync line is low only when the charge cycle is occurring. By following the rule that the host computer 16 can only communicate on the comm line 72 with the PUs 20 when the sync line 74 is low, it is ensured that there will never be a case when information is sent during the read cycle when interrupts are disabled.

In the host computer 16, the clear-to-send (CTS) line (not shown) on RS-232 ports regulates flow of data to and from the PUs 20 according to when the line is high or low. The sync line 74 is thus connected to the CTS line through an RS-485 to RS-232 converter for preventing the host computer 16 from sending data when the PU 20 is unable to process it.

Actuating the Automatic Servicing Unit

As previously noted, the system of the invention includes a second, occupant controlled transmitter for starting, controlling, and finishing servicing in accordance with the invention. The control transmitter 95, shown in FIG. 9 is arranged within the vehicle to be operated by an occupant of the vehicle. Advantageously the control transmitter communicates servicing data, for example, as to the amount or grade of fuel to be supplied, or the money equivalent for which fuel is desired.

In another embodiment, the control transmitter is an electromagnetic or acoustic wave transmitter/receiver means in the vehicle and on the fuel dispenser unit. Preferably, infra-red (IR) light waves are employed.

Figure 15:
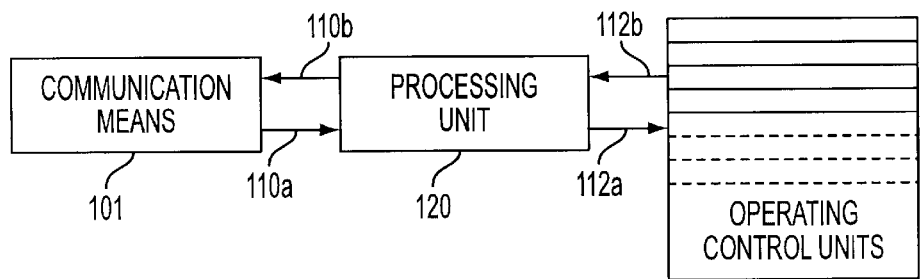
FIG. 15 shows one embodiment of a general block diagram of the system of the present invention.

In FIG. 15 a block scheme of the system of the present invention, only presented in most generalized form, is shown. Control transmitter 101 means has signal links 110*a* and 110*b*, respectively to and from a processing unit 20, which has further communication links 112*a* and 112*b*, respectively to and from operating control units 121.

In more detail, the control transmitter 101 includes elements necessary to transmitting a signal and initiating and controlling a service procedure to a processing unit. In accordance with the invention the means transmitter 101, which is located within the vehicle to be serviced.

In an advantageous embodiment of the present invention the control transmitter 101 includes a vehicle control means connected to a light emitting diode (LED) for transmission of infra-red light (IR) signals to at least one IR-receiver at the computer side of the links. Conventionally the electronic circuity includes a custom-integrated circuit, i.e., a chip which has been adapted for a specific sequence of operations. In the present case the circuitry is adapted for transmitting and receiving specifically coded data signals.

It will be clear to one skilled in the art that communication linkage can be effected also by other types of electromagnetic waves employing corresponding transmitter/receiver combinations, or even by acoustic waves, consequently necessitating suitable transmitter/receiver devices.

The PU 120, including known memory units, and an arithmetic and logic unit, processes the above signals after having been converted to PU matched signals. In particular the signals are directed to and from respective operating control units 121 including, for example, units for vehicle position determination on-off controls and fuel type and volume determination. Generally PU 120 and units 121 are in one housing. From this housing, circuitry is connected to different operating units, such as robot arm devices, fuel supply devices, and communication means as far as the computer side is involved.

In further embodiments the car-side part of the communication means can include more sophisticated operation devices such as in-car terminals including keyboard means and display means, thus capable of being employed for much more advanced use. Also, combinations of the above-mentioned in-car control transmitter are included in the present invention.

Figure 16:
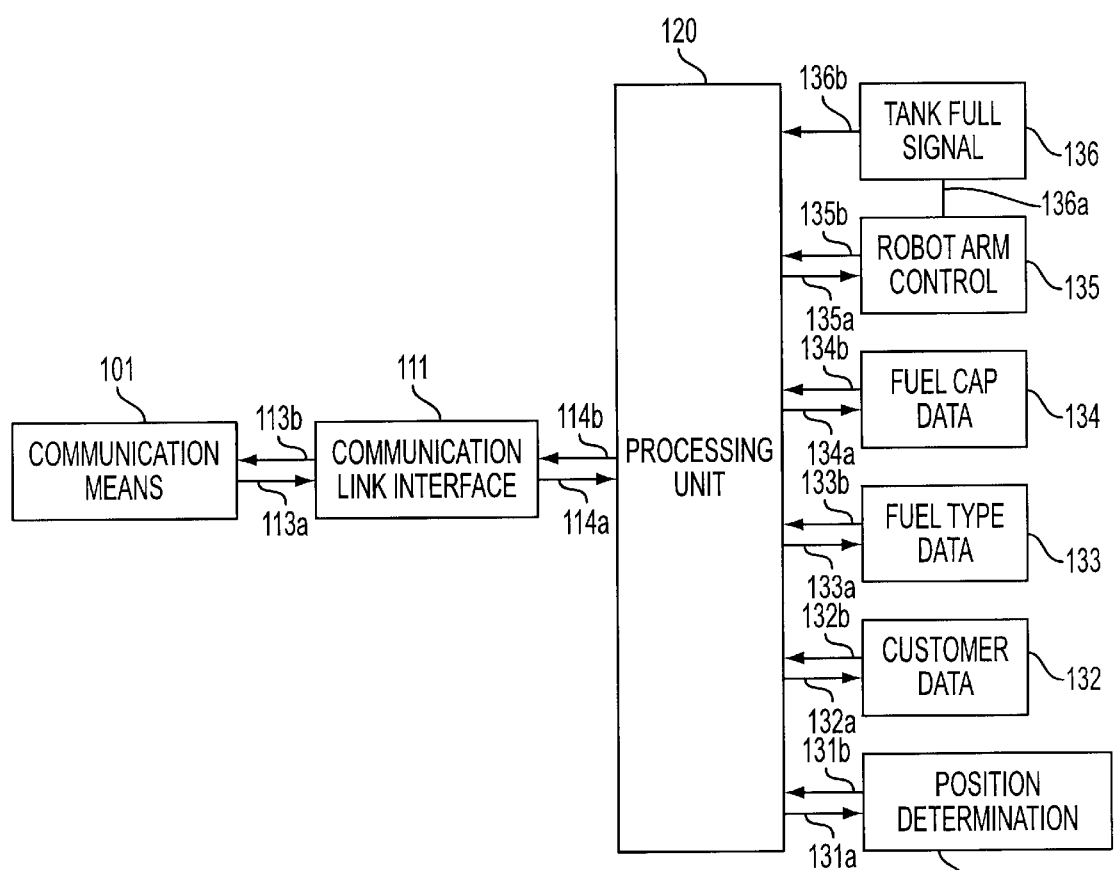
FIG. 16 shows a block diagram of the system in accordance with the present invention featuring one embodiment of the communication links between the transmitter operated by the vehicle occupant and control units for controlling the supply of fuel to the vehicle.

In FIG. 16 a block scheme of the system in accordance with the invention is shown, presenting in more detail communication links between customer operated communication means and specific control units for controlling corresponding fuel supply operating units.

Analogous to FIG. 15, control transmitter 101, a PU 120, and operating control units 131 to 136 are shown, the control units being linked either to the PU or between each other by means of links 131*a,b* to 136*a,b*. Further to the above units a communication link interface 114 is shown, respectively linked to the communication means 101 through links 11*a,b* and to the PU 120 through links 114*a,b*.

The communication links, both as shown as to FIG. 15 and as FIG. 16 are employed to allow the vehicle occupants to transmit signals controlling servicing being carried out. The data signals can include signals, concerning the vehicle, for example, fill pipe and fuel cap position data, fuel type data, and cap lock data. After having been received at the computer side of the control system, the signals are processed and converted to control data signals for the above operating units, which will be explained below, for the respective data, in particular with respect to FIG. 18.

Figure 17:
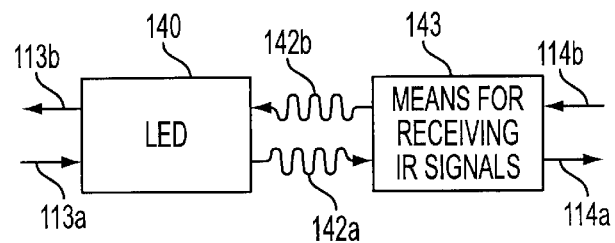
FIG. 17 shows in more detail an embodiment of the communication system in accordance with the invention.

With reference to FIG. 17 the above interface 111 described in more detail. The vehicle occupant, having signaled his arrival through one or both transponders providing an identification signal to the system, parks the vehicle alongside a fuel dispenser unit and requests refueling by operating the in-vehicle control transmitter which also can transmit payment authorization and selection of fuel grade. The IR signals 140 are transmitted and are received, for example, by an IR receiver 143.

The IR receiver 143 converts and forwards the signals in order to be processed in the PU 20.

In FIG. 16 a position determination means 131 receives the above image signals 13 1a via the PU 20, and, after determination of the position, data signals generated are supplied via a signal link 131b to a memory unit of the PU 20 for being used in the further refueling procedure.

The signal forms representing coded data as mentioned above are of interest as well. The data signals coded in digital form are received by well-known receiver means and processed in operating control units to identify control data, fill pipe and fuel cap position data, cap lock control data and fuel type and amount control data.

To start the fuel supply step the generated control data are read from the respective memory units and combined to a combined data acceptance signal by means of the PU 20.

The combined data acceptance signal is sent to a robot arm control unit 135 via a link 135a in order to enable robotic fuel pump nozzle 9 (shown in FIG. 1) to carry out the fuel supply step. Subsequently the robot arm will be moved into position along rail 8 to deliver the type of fuel requested to the vehicle fueling port. After having been connected, the robot arm is moved to the fuel cap (not shown). The fuel cap is opened by means of an unlocking device built in the nozzle end of the robot arm.

Referring again to FIG. 16, in one embodiment a sensor 136 arranged upon the robot arm nozzle 9 and activated during refilling by a signal link 136a detecting that the tank has been filled up, and generating a detection signal 136b which is directed to the PU 20 which in turn continues data processing in that the robot arm will be moved back to its starting position. In another embodiment, dependent on the facilities arranged in the vehicle, an interruption signal for stopping the fuel supply step is generated by the customer, and subsequently transmitted to the PU 20, processed by the PU, and sent to the robot control unit 135 to stop the fuel supply step. According to the control signal the robot arm is moved back to its starting position. In both alternatives a reversed fuel cap handling procedure is followed.

As a last event in finishing the refueling procedure the customer has to be informed that he is ready for departure. Again dependent on the facilities present in the vehicle, in one embodiment on a display of the in-car terminal the above information is presented, whereas in another embodiment for example, a light signal or an acoustic signal is observed by the customer.

Figure 18:
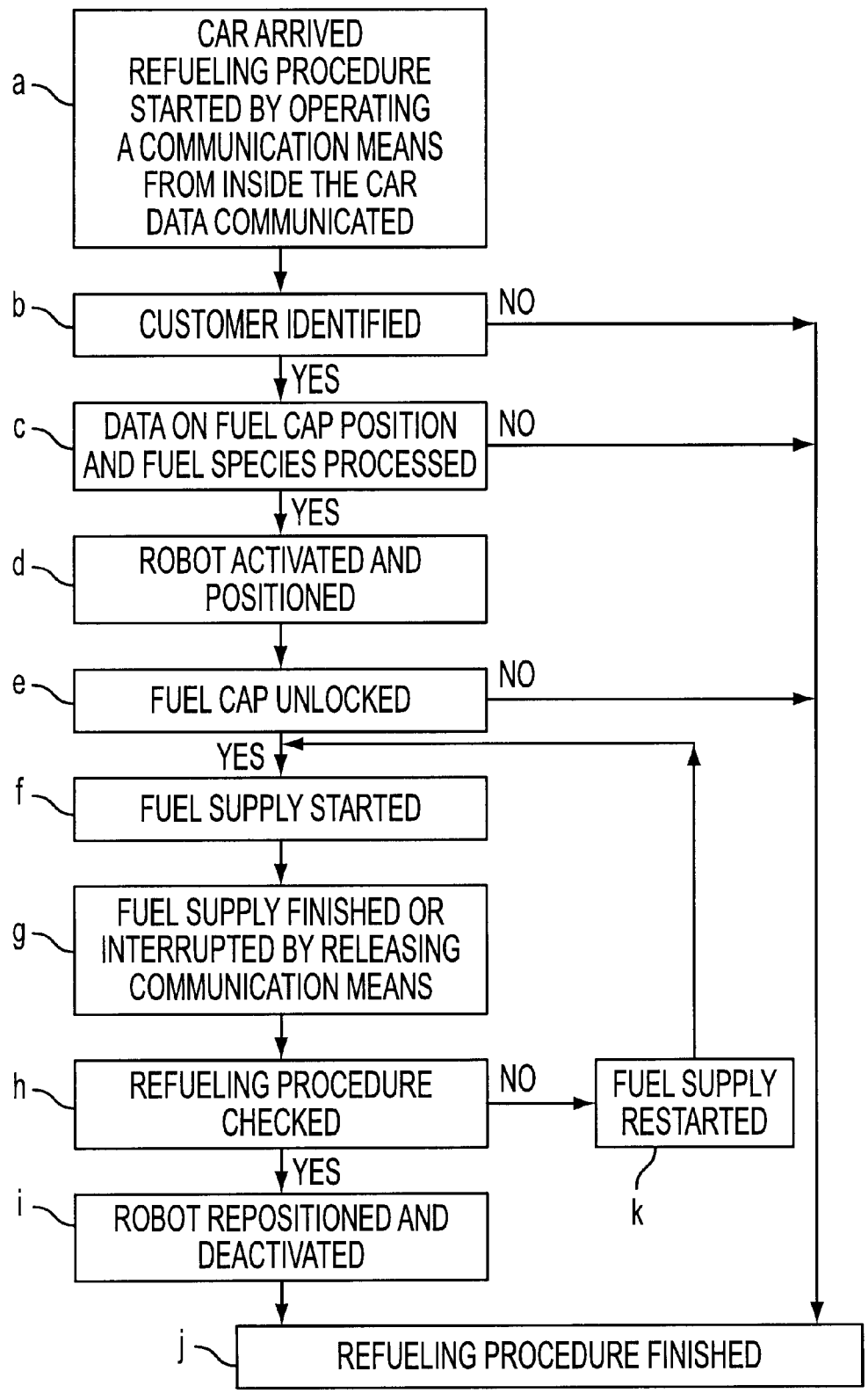
FIG. 18 shows a flow chart of an embodiment of an operating sequence in accordance the system of the invention.
Figure 19:
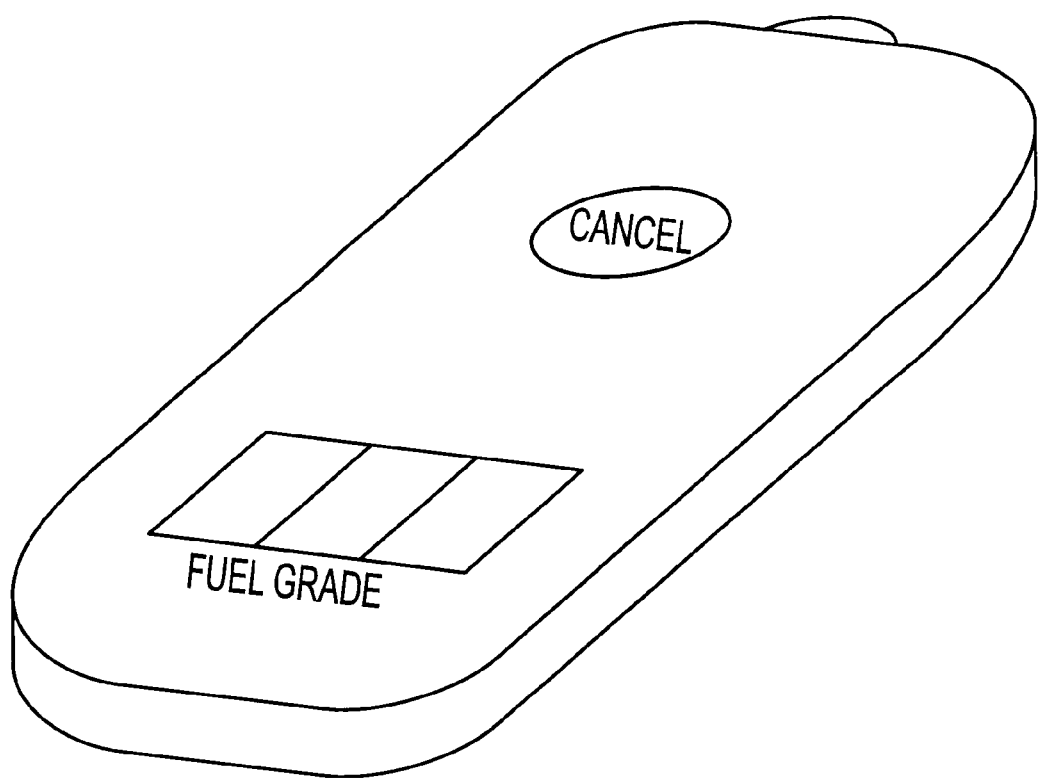
FIG. 19 is a perspective view of a hand-held unit for generating the second control signal according to the invention.

Now referring to FIG. 18 a flow chart of an embodiment of an operating sequence to be effected by the system of the invention is shown.

In the FIG. 18 steps (a) to (k) are distinguished. The steps mainly correspond with the procedures carried out by the system as explained above.

In step (a) the start request is presented subsequent to one or both transponders in the vehicle having payment and servicing by a first identification signal provided to the customer identification and processing unit. The customer starts the servicing procedure using transmitter 95 after having parked the vehicle alongside the fuel dispenser or other servicing unit. In a further embodiment, a parking detecting and parking control procedure can be provided, especially for refueling, in order to insure parking at the right place thereby assuring that the robot arm can reach the fueling port of the vehicle.

In steps (a) and (c) respectively the above mentioned a signal is processed in order to generate a combined data acceptance signal for further control of the robot arm and to start the fuel supply steps of the refueling procedure.

In steps (d), (e), and (f) fuel is supplied by means of the robot arm operation as explained above.

In step (g) finishing or interruption of the refueling procedure is presented whereas in step (h) a further check on the procedure is carried out.

In steps (i) and (j) finishing the fueling procedure is carried out in accordance with the data supplied. Corrections or modifications can be carried out before going for step (k), which is a restarting operation.

In a further advantageous embodiment of the system of the present invention the communication means communicates further refueling procedure data. In particular such data relates to the amount of fuel to be supplied, or the money equivalent for which fuel is desired, can be transmitted as coded data also.

In the sequence any system shown above the refueling procedure is carried out fully automatically.

In accordance with the invention electronic circuitry for holding the above-mentioned data and to be used for communication to the above system is provided also. The invention furthermore provides a fuel dispenser unit coupled to the above system.

Various modifications of the present invention will become apparent to those skilled in the art from the foregoing description and accompanying drawings. For example, a freely moveable and hand-operated service panel for IR communication is also encompassed by the invention.

The system of the present invention allows the quick, efficient, and safe providing of service for vehicles and the vehicles occupants, generally without the vehicle occupant having to emerge from the vehicle or to become physically involved in the actual servicing of the vehicle. In accordance with the invention, fuel, for example, can be paid for, selected, and pumped into the vehicle's tank, all with the vehicle operator remaining in the vehicle in full control of the operation and without having to roll the window down. Other services, such as the washing of the vehicle, can be provided in a similar fashion. Exiting the vehicle during the servicing stop is limited to situations where it is desired to use the station's bathroom facilities or obtain merchandise available at a dispensing station. With respect to obtaining merchandise at a remote dispensing station, the present system allows automatic prepayment thereby speeding up the process. The system of the invention further provides considerably enhanced safety, especially during the critical and potentially hazardous refueling operation. The robotic aspect of the invention permits fueling of the vehicle without any direct involvement by any of the vehicle's occupants who remain within the vehicle and do not take part in the actual pumping operation. The vehicle's occupants do, however, retain control over the automatic refueling operation using the signal generating device of the invention which allows selection of fuel grade, amount of fuel, and immediate starting and termination of the refueling operation.

As already noted, the system of the invention operates initially by receiving a signal from the vehicle, either as it approaches the dispensing terminal or at the terminal itself This signal identifies the customer and the credit arrangement for payment and transmits an authorization signal to the central control facility. Once the vehicle is properly aligned at the dispensing terminal, the customer, who may be the vehicle driver or other occupant, signals from inside the vehicle using the second signal generator, which is generally a hand-held device, indicating the type and quantity or value of fuel or other merchandise or services desired, and initiates the desired servicing procedure.

In the case of fueling the vehicle, the robotic fuel pump, once activated, automatically positions itself in alignment with the vehicle's refueling port, removes the fuel cap from the vehicle, inserts the fueling nozzle into the fuel filler pipe and begins pumping the indicated quantity and type of fuel into the vehicle. Systems aligning the fuel pump with the vehicles refueling port are described in the noted Corfitsen patent incorporated herein by reference. At the conclusion of the refueling operation, the pump nozzle is automatically withdrawn from the vehicle, the cap is replaced and the vehicle is ready to proceed. Identification of the exact location of the vehicle and the fueling port are advantageously facilitated by providing sensors on the vehicle either proximate the fueling port or in another location with the necessary parameters to identify the exact location and type of fuel port being stored in a data bank accessible to the computer control system. Alternatively, information relating to the vehicle type and the exact location and characteristics of the fueling port could be stored in the data bank activated when the vehicle first approaches the servicing terminal.

The system of the invention can be further facilitated by providing a data screen at the terminal station which is visible to the occupants of the vehicle providing information, for example, relating to proper vehicle positioning, grades of available fuel, quantity to be pumped or being pumped, cost, and additional goods and services available through the system.

Additionally, the system of the present invention can be provided in several variations. As heretofore described, the first signaling generator, which authorizes the transaction and payment and identifies the customer, can be a vehicle mounted transponder or alternatively a hand-held transponder which functions once the vehicle has stopped along side the dispensing terminal. In alternative embodiments, one or the other of the hand-held or the car mounted first signal transponders may be dispensed with and only a signal transponder unit employed. Further, the hand-held, first signal transponder could be combined into a single unit with the second signal control transmitter employed by the vehicle occupant to initiate, select, and control the actual servicing of the vehicle.

It will be apparent to those skilled in the art that various modifications and variations can be made in accordance with the present invention without departing from the scope or spirit of the invention. Other embodiments of the invention will be apparent to those skilled in the art from consideration of the specification and examples that should be considered as exemplary only with a true scope and spirit of the invention being indicated by the following claims.

What is claimed is:

1. A system for allowing an occupant of a vehicle to initiate, pay for, and control remotely servicing of the vehicle and its occupants from the vehicle, the system comprising:

a customer identification and processing unit for retaining and transmitting customer identification data and for producing a signal authorizing payment and approving servicing of the vehicle and its occupants in response to a communicated identification signal from the vehicle;

an automatic servicing unit operatively connected to said identification and processing unit for servicing the vehicle and its occupants upon receipt of an authorization signal from the vehicle and approval signal from the identification and processing unit;

a first signal communicator for communicating said identification signal when the vehicle is within a predetermined range of the identification and processing unit; and a second signal communicator controlled by the occupant of said vehicle for producing said authorization signal and controlling said servicing.

2. The system of claim 1 wherein the said servicing includes refueling the vehicle.

3. The system of claim 2 wherein said automatic servicing unit includes an automatic fuel dispenser for supplying said fuel to said vehicle which includes means for transferring fuel from bulk storage to an inlet of a fuel tank in the vehicle, said transfer means including a moveable dispensing head and associated nozzle, guidance means for directing said dispensing head and nozzle toward the fuel tank inlet and engagement means for engaging and disengaging said nozzle and said fuel tank inlet.

4. The system of claim 1 wherein said identification and processing unit includes a unit for communicating said identification signal with said first signal communicator within said predetermined range.

5. The system of claim 1 wherein said servicing includes transactions for providing merchandise to the vehicle occupants.

6. The system of claim 5 wherein said merchandise is food and/or beverages.

7. The system of claim 1 wherein said servicing includes washing the vehicle.

8. The system of claim 1 wherein said first signal communicator is a hand held transponder that produces said identification signal within a predetermined range which is proximate the identification and process unit.

9. The system of claim 8 wherein said first and second signal communicator comprise a single unit.

10. The system of claim 1 wherein said second signal communicator also produces signals designating specific services and merchandise.

11. The system of claim 1 wherein said first and second signal communicator comprise a single unit.

12. The system of claim 1 wherein said first signal communicator comprises:

a first, vehicle mounted transponder which transmits said signal to the identification and processing unit; and a second, hand held transponder that produces an identification signal proximate the identification and processing unit.

13. The system of claim 1 wherein said servicing terminal is a fueling terminal.

* * * * *